(12) United States Patent
Klinker

(10) Patent No.: US 8,607,735 B1
(45) Date of Patent: Dec. 17, 2013

(54) VEHICULAR DOG BED AND INTEGRATED RESTRAINING SYSTEM

(76) Inventor: Brooke Klinker, Little Elm, TX (US)

( * ) Notice: Subject to any disclaimer, the term of this patent is extended or adjusted under 35 U.S.C. 154(b) by 98 days.

(21) Appl. No.: 13/448,454

(22) Filed: Apr. 17, 2012

(51) Int. Cl.
  *A01K 1/035* (2006.01)
(52) U.S. Cl.
  USPC .......................................... 119/28.5; 119/771
(58) Field of Classification Search
  USPC ........................................ 119/28.5, 771, 769
  See application file for complete search history.

(56) References Cited

U.S. PATENT DOCUMENTS

| | | | |
|---|---|---|---|
| 4,597,359 A * | 7/1986 | Moorman | 119/28.5 |
| 5,005,526 A * | 4/1991 | Parker | 119/751 |
| 5,479,892 A * | 1/1996 | Edwards | 119/771 |
| D461,966 S | 8/2002 | Reece | |
| 6,591,787 B1 | 7/2003 | Gantz et al. | |
| 7,204,205 B2 | 4/2007 | O'Donnell | |
| 7,717,062 B2 | 5/2010 | Kline | |
| 8,056,927 B2 | 11/2011 | Singh | |
| 2011/0083615 A1 | 4/2011 | Aaron et al. | |

* cited by examiner

*Primary Examiner* — Yvonne Abbott
(74) *Attorney, Agent, or Firm* — Kyle Fletcher

(57) ABSTRACT

The vehicular dog bed and integrated restraining system includes a dog bed uniquely able to secure atop of a center console, and in between the front seats of the vehicle. The dog bed includes straps that encircle the console in order to secure the dog bed thereon. A pet harness system attaches to the rear of the dog bed, and includes a strap with a hook for securing a dog atop of the dog bed. The pet harness system may also include looped straps that secure the pet harness system to the front seats of the vehicle.

16 Claims, 5 Drawing Sheets

FIG. 3
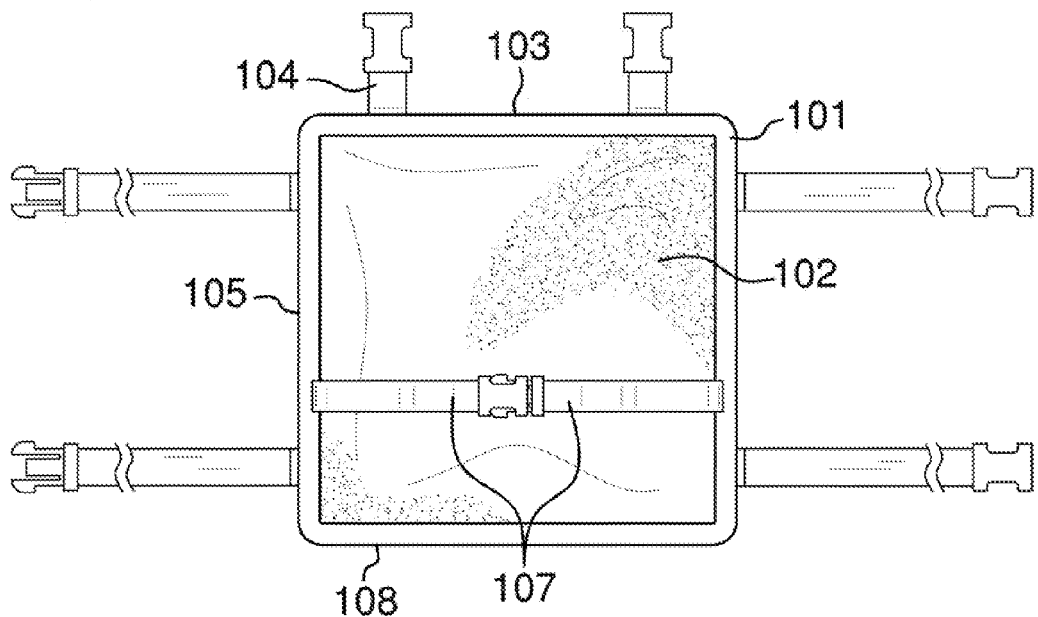
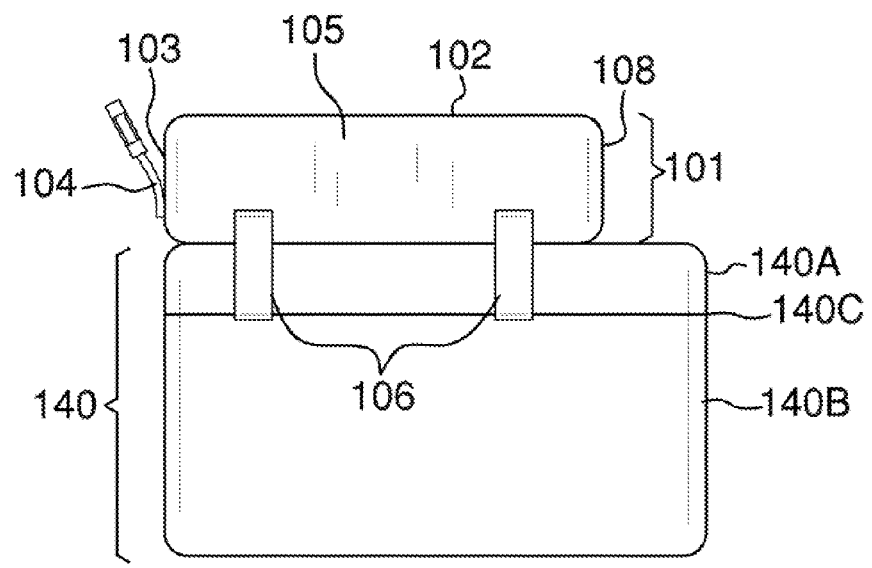
FIG. 4

VEHICULAR DOG BED AND INTEGRATED RESTRAINING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of dog beds, more specifically, a dog bed uniquely adapted for use within a vehicle, and used in conjunction with a restraining system to further secure a dog thereon.

B. Discussion of the Prior Art

As will be discussed immediately below, no prior art discloses a dog bed uniquely designed to work atop of a center console in between the front seats of a vehicle; wherein the dog bed is secured atop of the center console via straps that encircle said console; wherein a pet harness system attaches to a rear of said dog bed and optionally may further attach to adjacent front car seats for further securing said pet harness system to the dog bed; wherein the pet harness system includes a strap and hook for securing a dog atop of the dog bed; wherein the dog bed may include a soft foam or cushioning structure.

The Singh Patent (U.S. Pat. No. 8,056,927) discloses a pet restraint harness system for use in a vehicle. However, the harness system does not provide a dog bed that is mounted atop of a console, and which includes a harness for securing a dog atop of said dog bed.

The Aaron et al. Patent Application Publication (U.S. Pub. No. 2011/0083615) discloses a pet restraint harness system for use in a vehicle. Again, the pet restraint harness system does not include a dog bed that works in conjunction with a harness system to secure a dog atop of a center console.

The Kline Patent (U.S. Pat. No. 7,717,062) discloses a pet seat that attaches to the console structure of a vehicle. However, the pet seat is not a dog bed that secures itself atop of a console, and from which a harness system attaches to a dog and adjacent seats in order to secure a dog atop of the dog bed, and collectively atop of the console.

The O'Donnell Patent (U.S. Pat. No. 7,204,205) discloses a seat for a pet that attaches to the console of a vehicle. Again, the seat is not a dog bed that secures itself atop of the console and works in conjunction with a harness system to secure a dog thereon.

The Gantz et al. Patent (U.S. Pat. No. 6,591,787) discloses a pet console seat that attaches to the center console of a vehicle between the front seats of the vehicle. However, the pet console relies upon a bar engaging with the rear of the vehicle's bucket seats, and not a harness system that secures the seat atop of the console, and also secures the dog atop of the seat.

While the above-described devices fulfill their respective and particular objects and requirements, they do not describe a dog bed uniquely designed to work atop of a center console in between the front seats of a vehicle; wherein the dog bed is secured atop of the center console via straps that encircle said console; wherein a pet harness system attaches to a rear of said dog bed and optionally may further attach to adjacent front car seats for further securing said pet harness system to the dog bed; wherein the pet harness system includes a strap and hook for securing a dog atop of the dog bed; wherein the dog bed may include a soft foam or cushioning structure. In this regard, the vehicular dog bed and integrated restraining system departs from the conventional concepts and designs of the prior art.

SUMMARY OF THE INVENTION

The vehicular dog bed and integrated restraining system includes a dog bed uniquely able to secure atop of a center console, and in between the front seats of the vehicle. The dog bed includes straps that encircle the console in order to secure the dog bed thereon. A pet harness system attaches to the rear of the dog bed, and includes a strap with a hook for securing a dog atop of the dog bed. The pet harness system may also include looped straps that secure the pet harness system to the front seats of the vehicle.

It is an object of the invention to provide a dog bed and pet harness system that work to secure both a dog bed and dog onto a console of a vehicle, and in between the front seats of the vehicle.

Another object of the invention is to include a dog bed that includes straps that secure the dog bed atop of the console, and which uses the straps to encircle the console thereby securing the dog bed thereon.

A further object of the invention is to provide a pet harness system that secures to the rear of the dog bed, and from which includes a strap and hook for securing a dog onto the dog bed.

A further object of the invention is to provide a pet harness system that may optionally include straps for securement with the two front seats of the vehicle, in order to provide additional securing measures for use there with.

An even further object of the invention is to include looped straps that encircle the headrest of the respective vehicle seat in order to provide an easy to use pet harness system that is easily secured to the dog bed, the dog, and the respective vehicle seats.

These together with additional objects, features and advantages of the vehicular dog bed and integrated restraining system will be readily apparent to those of ordinary skill in the art upon reading the following detailed description of presently preferred, but nonetheless illustrative, embodiments of the vehicular dog bed and integrated restraining system when taken in conjunction with the accompanying drawings.

In this respect, before explaining the current embodiments of the vehicular dog bed and integrated restraining system in detail, it is to be understood that the vehicular dog bed and integrated restraining system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular dog bed and integrated restraining system.

It is therefore important that the claims be regarded as including such equivalent construction insofar as they do not depart from the spirit and scope of the vehicular dog bed and integrated restraining system. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates a top view of the dog bed by itself and with straps extending from opposing sides and to the rear of the dog bed;

FIG. 4 illustrates a side view of the dog bed secured atop of a console;

DETAILED DESCRIPTION OF THE EMBODIMENT

Figure 1:
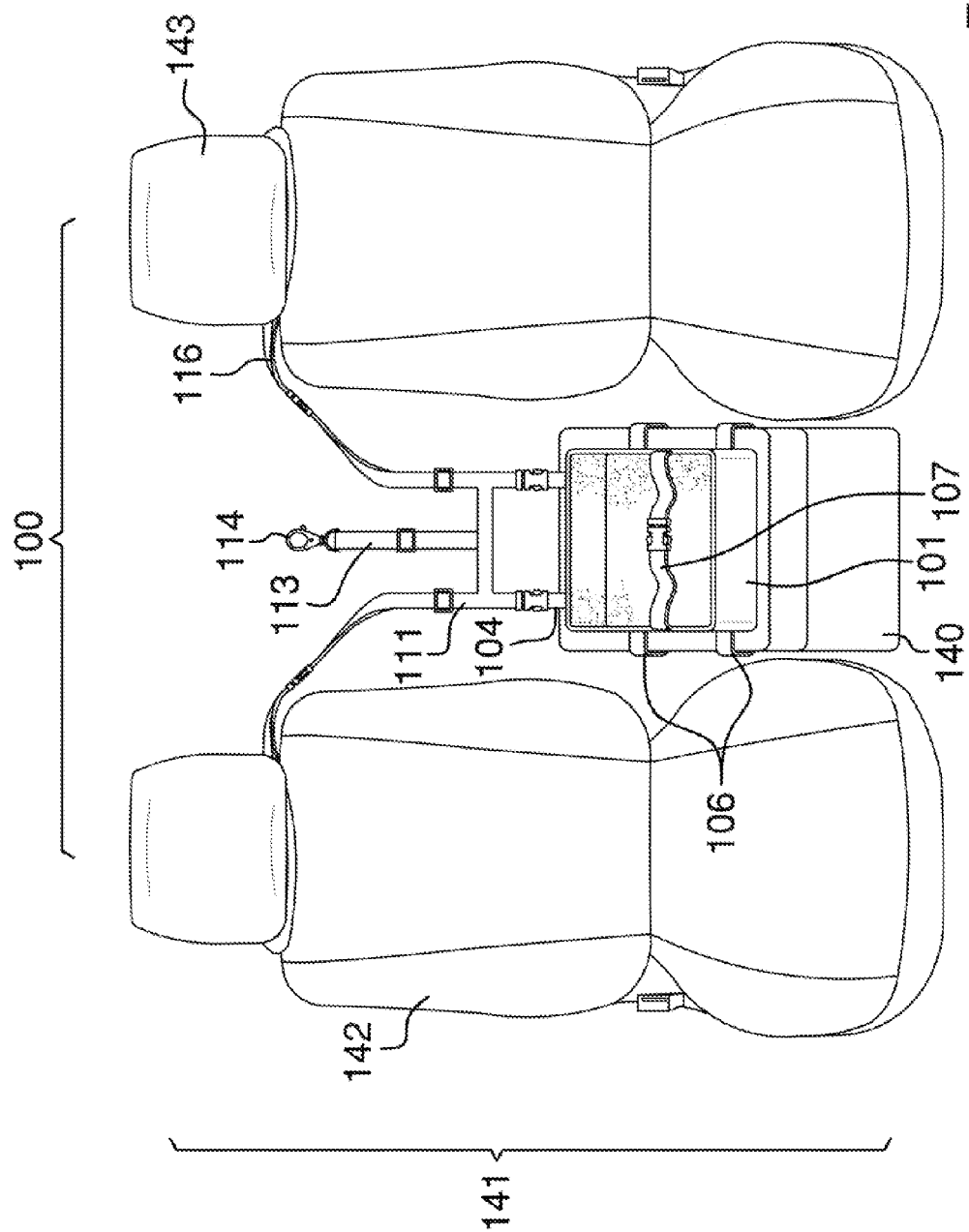
FIG. 1 illustrates a front view of the vehicular dog bed and integrated restraining system installed on a console and with the pet harness system including looped straps for securement with the headrests of the front vehicle seats.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-7. A vehicular dog bed and integrated restraining system 100 (hereinafter invention) includes a dog bed 101 of no particular size or shape. The dog bed 101 is constructed a soft cushioning material that is comfortable for a dog 130 to be seated on a top surface 102 of the dog bed 101.

The dog bed 101 is further defined with a rear surface 103 from which at least one buckled strap 104 extends. The dog bed 101 is also further defined by opposing side surfaces 105 that include corresponding console securing straps 106, which are designed to secure the dog bed 101 onto a console 140 of a vehicle 141. It shall be noted that the invention 100 is specifically designed to place the dog bed 101 in between front vehicle seats 142 of the vehicle 141, and atop of the console 140, which is located between the front vehicle seats 142.

It shall be noted that in order for the invention 100 to operate effectively, and secure the dog bed 101 atop of the console 140, the console securing straps 106 shall extend through the console 140 or otherwise encircle the console 140. In referring to FIGS. 4 and 5, the console 140 is further defined by a lid 140A and base 140B that are hingedly attached to one another, and which form an interface 140C through which the console securing straps 106 extend.

The dog bed 101 may also include a pair of dog straps 107 that extends upwardly from the top surface 102 of the dog bed 101, and provides an additional means of securing the dog 130 onto the dog bed 101. It shall be further noted that the dog straps 107 are located nearer a front surface 108 of the dog bed 101 as opposed to the rear surface 103.

The invention 100 includes a pet harness system 110, which is used to secure the dog 130 onto the dog bed 101. The pet harness system 110 works in conjunction with the buckled strap(s) 104 located on the rear surface 103 of the dog bed 101 such that the pet harness system 110 from behind the dog bed 101 and the console 140, and which does not interfere with the space in front of the console 140. It shall be further noted that the pet harness system 110 is specifically dedicated to securing the dog 130 from the rear of the invention 100 in order to eliminate the applicable straps from interfering with the driver or adjacent occupant while seated within the vehicle 141.

Figure 2:
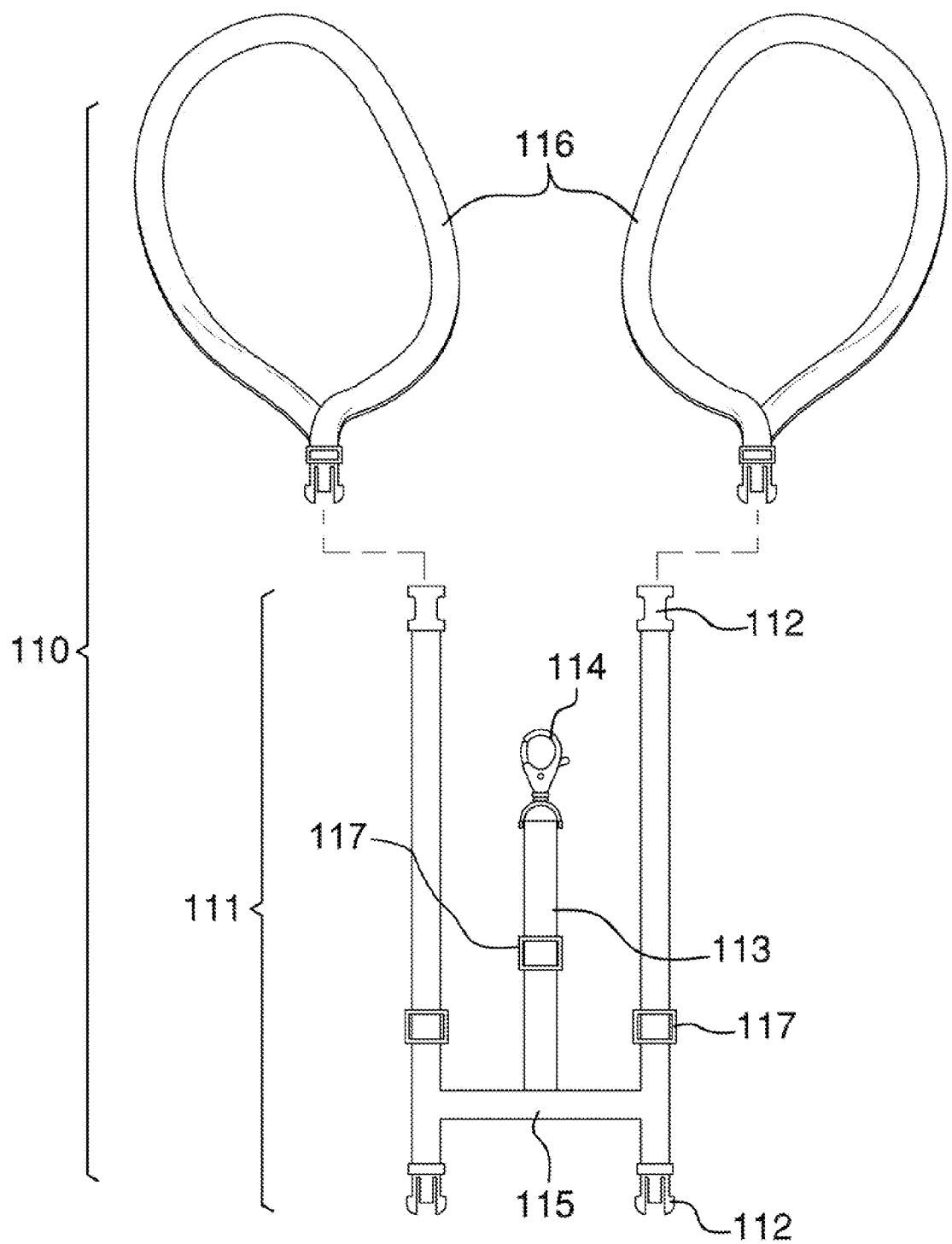
FIG. 2 illustrates a view of the pet harness system by itself and with the looped straps detached with respect to the remaining portion of the pet harness system.
Figure 5:
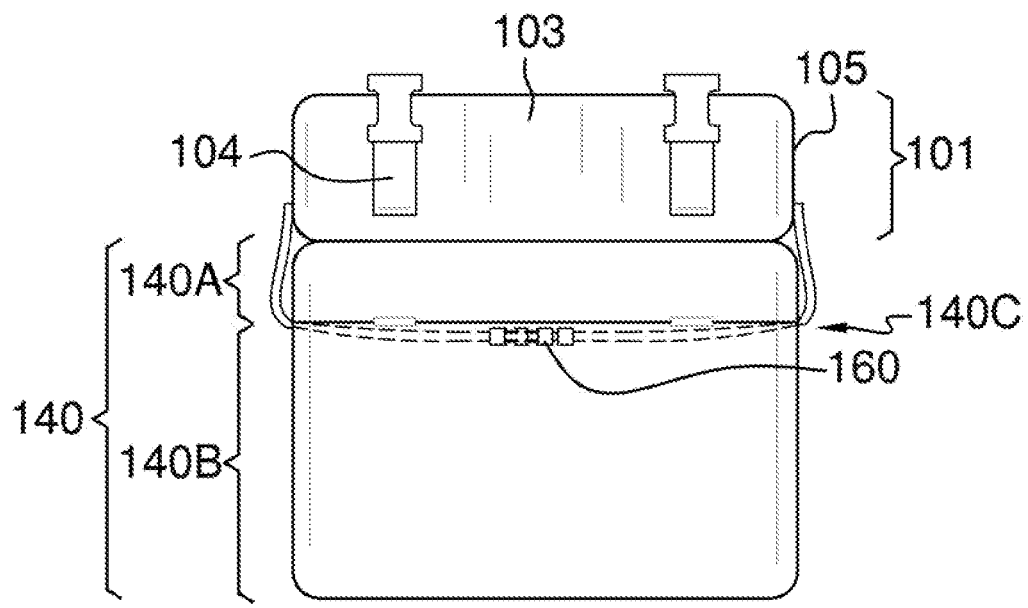
FIG. 5 illustrates a rear view of the dog bed secured atop of the console, and further detailing straps encircling the console.
Figure 6:
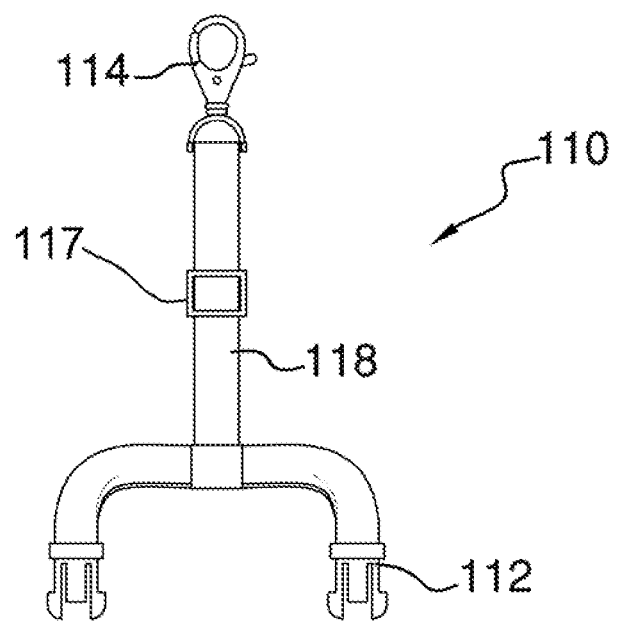
FIG. 6 illustrates a view of an alternative embodiment of the pet harness system by itself with the strap and hook extending directly from buckles, which secure to the rear of the dog bed directly.

Referring to FIG. 2, the pet harness system 110 includes an "H"-shaped strapping 111 including buckled members 112 at distal ends, which are used to secure the pet harness system 110 to the buckled strap(s) 104 of the dog bed 101. Moreover, the pet harness system 110 includes a strap 113 and hook 114 that extend from a central member 115 of the "H"-shaped strapping 111. Moreover, the strap 113 and the hook 114 extend to and attach to a dog collar 131 of the respective dog 130, and thereby securing the dog 130 to the top surface 102 of the dog bed 101. The strap 113 may include an adjustment buckle 117, which requires the strap 113 to loop thereon in order to provide for adjustment of the overall length of the strap 113 as is needed with differently sized dogs 130 and differently shaped and/or sized vehicle interiors.

The pet harness system 110 may optionally include at least one looped strap 116, which secures to a respective buckled member 112, and which encircles a headrest 143 of the adjacent front vehicle seat 142. The inclusion of the looped strap(s) 116 is to provide an added security measure in securing the dog 130 onto the dog bed 101, and also to secure the dog 130 between the two front vehicle seats 142. It should also be added that adjustment buckles 117 may be included on the "H"-shaped strapping 111 in order to adjust lengths of said strapping in order to accommodate different size and shape considerations with respect to different vehicles 141 that the invention 100 may be used therein.

Referring to FIG. 2, an alternative embodiment of the pet harness system 110 provides a more simplified approach to securing the dog 130 onto the dog bed 101. Moreover, the pet harness system 110 may simply involve a "Y"-shaped strapping 118 having buckled members 112 and the hook 114 defining the distal ends, which serve to secure to the buckled straps 104 of the dog bed 101 and to the dog collar 131 of the dog 130, respectively. The "Y"-shaped strapping 118 may also include an adjustment buckle 117 thereon in order to provide for adjustment of the overall length of the "Y"- shaped strapping 118 as associated with differently shaped and/or sized dogs 130 or vehicle interiors.

Figure 7:
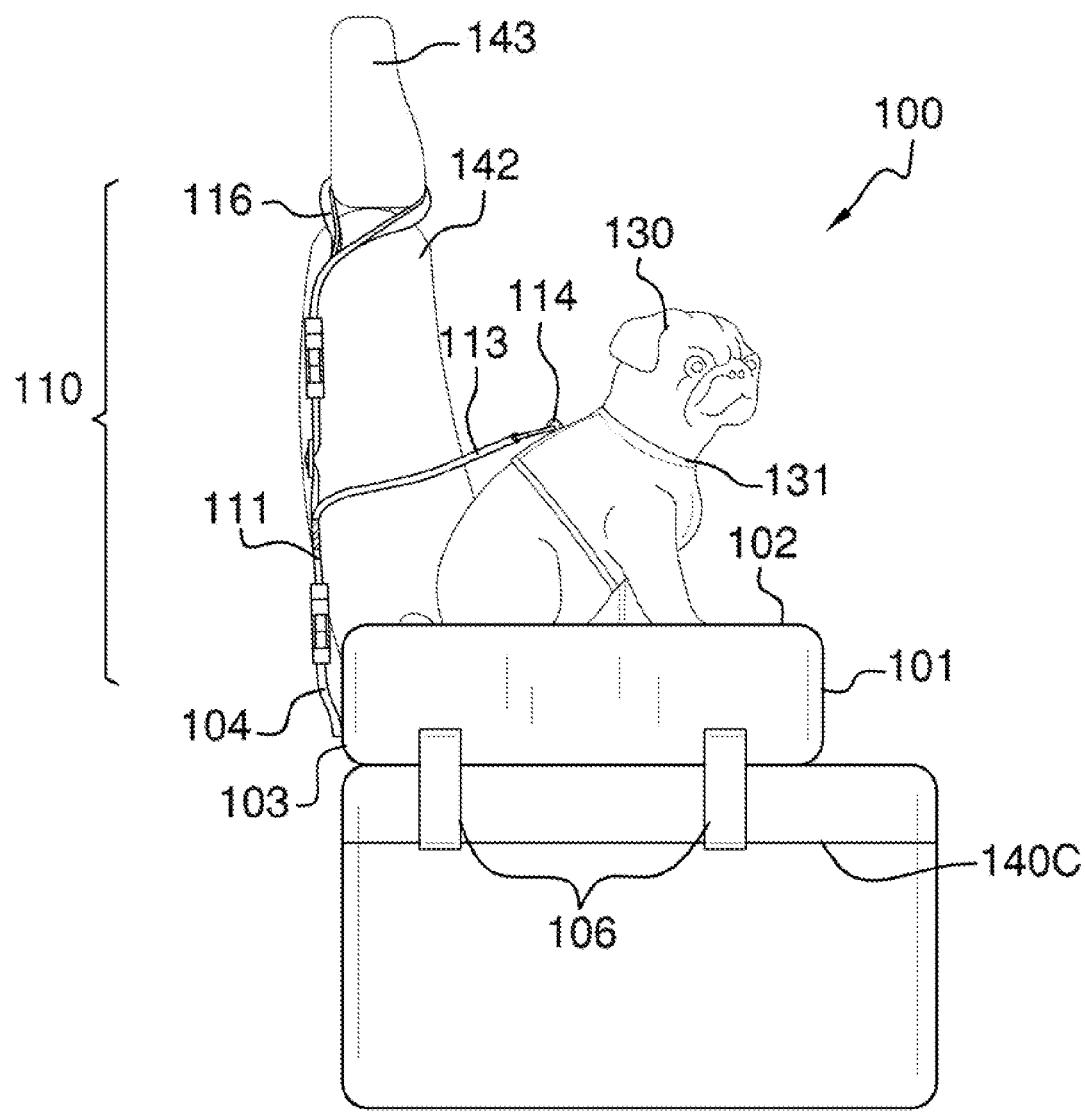
FIG. 7 illustrates a side view of the vehicular dog bed and integrated restraining system installed on a console with a dog seated atop of the dog bed, and further detailing a looped strap encircling the headrest.

It shall be noted that the term dog collar 131 is being used to refer to a plurality of items associated with asserting control over the respective dog 130. In FIG. 7, the dog collar 131 is depicted as a dog harness, but may involve a circular collar that only fits around the neck portion of the dog 130.

It shall be further noted that the term "strapping" and all applicable straps used with the invention 100 shall be constructed of a flexible fabric, such as a nylon webbing. Moreover, the use of nylon webbing or fabric is commonly associated within a car seat belt of a vehicle or with dog harnesses and collars.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A vehicular dog bed and integrated restraining system comprising:
    a dog bed that secures itself atop of a console inside of a vehicle such that a dog is secured thereon via a pet harness system thereby securing said dog between front vehicle seats;
    wherein the dog is secured to a top surface of the dog bed;
        wherein the dog bed is further defined with a rear surface and opposing side surfaces;
    wherein the dog bed includes a pair of dog straps that extends upwardly from the top surface of the dog bed;
        wherein the dog straps are nearer a front surface of the dog bed as opposed to the rear surface of the dog bed.

2. The vehicular dog bed and integrated restraining system as described in claim 1 wherein the dog bed includes at least one buckled strap that extends from the rear surface, and which connects to the pet harness system.

3. The vehicular dog bed and integrated restraining system as described in claim 2 wherein the pet harness system connects with the buckled strap of the dog bed in order to secure the dog atop of the dog bed; wherein the pet harness system secures the dog from behind the dog bed and behind the console.

4. The vehicular dog bed and integrated restraining system as described in claim 3 wherein the pet harness system includes an "H"-shaped strapping including buckled members at distal ends, which are used to secure the pet harness system to the buckled strap(s) of the dog bed; wherein the pet harness system includes a strap and hook that extend from a central member of the "H"-shaped strapping; wherein the strap and the hook extend to and attach to a dog leash of the respective dog, and thereby securing the dog to the top surface of the dog bed.

5. The vehicular dog bed and integrated restraining system as described in claim 4 wherein the pet harness system includes at least one looped strap, which secures to a respective buckled member, and which encircles a headrest of the adjacent front vehicle seat; wherein the pet harness system includes a "Y"-shaped strapping having buckled members and hook defining the distal ends, which serve to secure to the buckled straps of the dog bed and to a dog collar of the dog, respectively.

6. The vehicular dog bed and integrated restraining system as described in claim 1 wherein the dog bed also includes console securing straps on the opposing side surface, which correspond with one another, and from which encircle the console thereby securing the dog bed atop of the console.

7. A vehicular dog bed and integrated restraining system comprising:
    a dog bed that secures itself atop of a console inside of a vehicle such that a dog is secured thereon via a pet harness system thereby securing said dog between front vehicle seats;
    wherein the dog is secured to a top surface of the dog bed;
        wherein the dog bed is further defined with a rear surface and opposing side surfaces;
    wherein the dog bed includes at least one buckled strap that extends from the rear surface, and which connects to the pet harness system;
    wherein the dog bed includes a pair of dog straps that extends upwardly from the top surface of the dog bed;
        wherein the dog straps are nearer a front surface of the dog bed as opposed to the rear surface of the dog bed.

8. The vehicular dog bed and integrated restraining system as described in claim 7 wherein the dog bed also includes console securing straps on the opposing side surface, which correspond with one another, and from which encircle the console thereby securing the dog bed atop of the console.

9. The vehicular dog bed and integrated restraining system as described in claim 7 wherein the pet harness system connects with the buckled strap of the dog bed in order to secure the dog atop of the dog bed; wherein the pet harness system secures the dog from behind the dog bed and behind the console.

10. The vehicular dog bed and integrated restraining system as described in claim 9 wherein the pet harness system includes an "H"-shaped strapping including buckled members at distal ends, which are used to secure the pet harness system to the buckled strap(s) of the dog bed; wherein the pet harness system includes a strap and hook that extend from a central member of the "H"-shaped strapping; wherein the strap and the hook extend to and attach to a dog leash of the respective dog, and thereby securing the dog to the top surface of the dog bed.

11. The vehicular dog bed and integrated restraining system as described in claim 10 wherein the pet harness system includes at least one looped strap, which secures to a respective buckled member, and which encircles a headrest of the adjacent front vehicle seat.

12. The vehicular dog bed and integrated restraining system as described in claim 10 wherein the pet harness system includes a "Y"-shaped strapping having buckled members and hook defining the distal ends, which serve to secure to the buckled straps of the dog bed and to a dog collar of the dog, respectively.

13. A vehicular dog bed and integrated restraining system comprising:
    a dog bed that secures itself atop of a console inside of a vehicle such that a dog is secured thereon via a pet harness system thereby securing said dog between front vehicle seats;
    wherein the dog is secured to a top surface of the dog bed;
        wherein the dog bed is further defined with a rear surface and opposing side surfaces;

wherein the dog bed includes at least one buckled strap that extends from the rear surface, and which connects to the pet harness system;

wherein the dog bed also includes console securing straps on the opposing side surface, which correspond with one another, and from which encircle the console thereby securing the dog bed atop of the console;

wherein the pet harness system connects with the buckled strap of the dog bed in order to secure the dog atop of the dog bed; wherein the pet harness system secures the dog from behind the dog bed and behind the console;

wherein the dog bed includes a pair of dog straps that extends upwardly from the top surface of the dog bed; wherein the dog straps are nearer a front surface of the dog bed as opposed to the rear surface of the dog bed.

14. The vehicular dog bed and integrated restraining system as described in claim 13 wherein the pet harness system includes an "H"-shaped strapping including buckled members at distal ends, which are used to secure the pet harness system to the buckled strap(s) of the dog bed; wherein the pet harness system includes a strap and hook that extend from a central member of the "H"-shaped strapping; wherein the strap and the hook extend to and attach to a dog leash of the respective dog, and thereby securing the dog to the top surface of the dog bed.

15. The vehicular dog bed and integrated restraining system as described in claim 14 wherein the pet harness system includes at least one looped strap, which secures to a respective buckled member, and which encircles a headrest of the adjacent front vehicle seat.

16. The vehicular dog bed and integrated restraining system as described in claim 13 wherein the pet harness system includes a "Y"-shaped strapping having buckled members and hook defining the distal ends, which serve to secure to the buckled straps of the dog bed and to a dog collar of the dog, respectively.

* * * * *